United States Patent
Lerchner et al.

(10) Patent No.: US 11,842,270 B1
(45) Date of Patent: Dec. 12, 2023

(54) LEARNING ABSTRACTIONS USING PATTERNS OF ACTIVATIONS OF A NEURAL NETWORK HIDDEN LAYER

(71) Applicant: DeepMind Technologies Limited, London (GB)

(72) Inventors: Alexander Lerchner, London (GB); Demis Hassabis, London (GB)

(73) Assignee: DeepMind Technologies Limited, London (GB)

( * ) Notice: Subject to any disclaimer, the term of this patent is extended or adjusted under 35 U.S.C. 154(b) by 581 days.

(21) Appl. No.: 16/916,939

(22) Filed: Jun. 30, 2020

Related U.S. Application Data

(63) Continuation of application No. 14/971,617, filed on Dec. 16, 2015, now abandoned, which is a continuation of application No. 13/903,772, filed on May 28, 2013, now abandoned.

(51) Int. Cl.
*G06N 3/08* (2023.01)

(52) U.S. Cl.
CPC .................................... *G06N 3/08* (2013.01)

(58) Field of Classification Search
None
See application file for complete search history.

(56) References Cited

U.S. PATENT DOCUMENTS

| | | |
|---|---|---|
| 2012/0254086 A1 | 10/2012 | Deng et al. |
| 2013/0262096 A1 | 10/2013 | Wilhelms-Tricarico et al. |
| 2014/0310218 A1 | 10/2014 | Min et al. |

FOREIGN PATENT DOCUMENTS

| | | |
|---|---|---|
| EP | 2477141 | 7/2012 |

OTHER PUBLICATIONS

M Augasta et al. A Novel Pruning Algorithm for Optimizing Feedforward Neural Network of Classification Problems. Aug. 5, 2011. Neural Processing Letters. [retrieved from internet on Jan. 12, 2023] <URL: https://link.springer.com/article/10.1007/s11063-011-9196-7> (Year: 2011).*

(Continued)

*Primary Examiner* — Bion A Shelden
(74) *Attorney, Agent, or Firm* — Fish & Richardson P.C.

(57) ABSTRACT

We describe an artificial neural network comprising: an input layer of input neurons, one or more hidden layers of neurons in successive layers of neurons above the input layer, and at least one further, concept-identifying layer of neurons above the hidden layers. The neural network includes an activation memory coupled to an intermediate, hidden layer of neurons between the input concept-identifying layers to store a pattern of activation of the intermediate layer. The neural network further includes a system to determine an overlap between a plurality of the stored patterns of activation and to activate in the intermediate hidden layer an overlap pattern such that the concept-identifying layer of neurons is configured to identify features of the overlap patterns. We also describe related methods, processor control code, and computing systems for the neural network. Optionally further, higher level concept-identifying layers of neurons may be included.

10 Claims, 5 Drawing Sheets

(56) References Cited

OTHER PUBLICATIONS

H Lee et al. Sparse deep belief net model for visual area V2. 2007. Advances in Neural Information Processing Systems 20. [retrieved from internet on Jan. 12, 2023] <URL: https://papers.nips.cc/paper/2007/hash/4daa3db355ef2b0e64b472968cb70f0d-Abstract.html> (Year: 2007).*

R French. Using Semi-Distributed Representations to Overcome Catastrophic Forgetting in Connectionlst Networks. 1993. [retrieved from internet on Jan. 12, 2023] <URL: https://www.aaai.org/Papers/Symposia/Spring/1993/SS-93-06/SS93-06-007.pdf> (Year: 1993).*

Blum et al, "On learning monotone Boolean functions," Proceedings of the 39$^{th}$ Annual Symposium on Foundations of Computer Science, pp. 408-415, Nov. 1998.

Çağlar Gülçehre, "Knowledge Matters: Importance of Prior Information for Optimization," Mar. 15, 2013.

Ganter, "Formal Concept Analysis: Methods and Applications in Computer Science," TU Dresden, Summer 2003, 36 pages.

Geoffrey E. Hinton, "A Fast Learning Algorithm for Deep Belief Nets," Letter, Jun. 8, 2005.

Huynh et al, Guiding Hidden Layer Representations for Improved Rule Extraction from Neural Networks.

Huynh et al, Symbolic Representation of Recurrent Neural Network Dynamics.

Kearns et al., "On the learnability of Boolean formulae," In Proceedings of the 19$^{th}$ annual ACM symposium on Theory of computing, pp. 285-295, 1987.

Le, et al., "Building High-level Features Using Large Scale Unsupervised Learning," in *Proceedings of the 29$^{th}$ International Conference on Machine Learning*, Edinburgh, Scotland, UK, 2012, 11 pages.

Lee et al., "Sparse Deep Belief Net Model for Visual Area," V2, 2008.

Louie, A Biological Model of Object Recognition with Feature Learning.

Nitish Srivastava, "Multimodal Learning with Deep Boltzmann Machines," Paper, 2012.

Rifai, et al., "A Generative Process for Sampling Contractive Auto-encoders," in *Proceedings of the 29$^{th}$ International Conference on Machine Learning*, Edinburgh, Scotland, UK, 2012, 8 pages.

Toshua Bengio, "Evolving Culture vs. Local Minima," Nov. 29, 2012.

Valiant, "A theory of the learnable," Communications of the ACM, 27(11):1134-1142, Nov. 1984.

\* cited by examiner

LEARNING ABSTRACTIONS USING PATTERNS OF ACTIVATIONS OF A NEURAL NETWORK HIDDEN LAYER

CROSS-REFERENCE TO RELATED APPLICATIONS

This application is a continuation of and claims priority to U.S. application Ser. No. 14/971,617, filed on Dec. 16, 2015, which is a continuation of U.S. application Ser. No. 13/903,772, filed on May 28, 2013 (now abandoned). The entire disclosures of the prior applications are considered part of and are incorporated by reference in the disclosure of this application.

FIELD OF THE INVENTION

This invention relates to methods, processor control code, and computing systems for artificial neural networks.

BACKGROUND TO THE INVENTION

Artificial neural networks represent a promising approach for signal processing and, in particular, feature detection. In particular deep neural networks, which incorporate multiple hidden layers to enable higher level features to be defined using lower level features, have been shown to have promise in, for example, unsupervised learning to recognise relatively high level features such as faces ("Building high-level features using large scale unsupervised learning", Le et al, proceedings of the $29^{th}$ International Conference on Machine Learning, Edinburgh, Scotland, UK 2012; arxiv.org/pdf/1112.6209.pdf). Other types of artificial neural network such as general Boltzmann machines and Helmholtz machines also display promise but in practice these stochastic networks fail when used with more than toy data and research on these has essentially stalled for a decade or more.

One problem with deep/stochastic neural networks is that the weight-training gradient essentially vanishes a relatively small number of layers away from the input layer and is approximately zero after around three to ten layers. Another problem with existing neural networks is that they essentially model the input and are not able to identify features (concepts) which are never present on their own in the input or not salient in the input—for example an artificial neural network maybe presented with many different types of blue object but be unable to learn the concept of "blueness" on its own. Background prior art describing a temporal processor node comprising a memory module can be found in EP 2,477,141A.

There is a need for artificial neural network architectures and training techniques which address these and other problems and which facilitate the identification of generalised concepts and, in principle, rules.

SUMMARY OF THE INVENTION

According to a first aspect of the invention there is therefore provided a method of training a neural network, the method comprising: providing a neural network comprising an input layer of input neurons, a plurality of hidden layers of neurons in successive layers of neurons above said input layer and at least one concept-identifying layer of neurons above said intermediate hidden layers of neurons; wherein said hidden layers of neurons comprise a first hidden layer of neurons connected to said input layer of neurons, and one or more intermediate hidden layers of neurons above said first hidden layer of neurons, and wherein each said layer of neurons is connected to the layer of neurons below; training said neural network on a set of example inputs provided successively to said input layer of neurons to determine weights of connections between said first hidden layers of neurons and said one or more intermediate hidden layers of neurons of a feature-identifying subset of said neural network; presenting, successively, a set of further example inputs to said input neurons of said trained neural network; capturing a pattern of activation from a said intermediate hidden layer of neurons for each of said further example inputs; storing said captured patterns of activation from said intermediate hidden layer in an intermediate feature memory; identifying a plurality of overlap patterns of activation stored in said intermediate feature memory, wherein a said overlap pattern of activation is a pattern of activation within a said group of stored patterns of activation defining a subset of neurons in said intermediate hidden layer common to all the patterns of said group in which the neurons of said subset have greater than a threshold level of activation; activating neurons in said intermediate layer with successive said overlap patterns of activation; training said neural network on said overlap patterns of activation to determine weights of connections between said intermediate hidden layer and said concept-identifying layer of neurons to train a concept-identifying subset of said neural network; wherein said at least one concept-identifying layer of neurons comprises groups of neurons activatable by generalised concepts, wherein a said generalised concept comprises a (set of) features common to at least some of said example inputs but not represented as a distinct pattern of activation in said intermediate hidden layer separately from one or more other features of said example inputs represented in said intermediate hidden layer.

Broadly speaking, existing neural networks merely re-represent the input data on which they are trained. By contrast embodiments of the claimed method are able to identify new concepts, represented by the overlap patterns, which are not present per se in the input data but are "hidden" in the input distribution. In general, therefore, a concept learnt by embodiments of the method/architectures we describe is not defined by any single example in the training data. Thus in embodiments a generalised concept comprises a set of features common to at least some of the example inputs but not represented as a distinct pattern of activation in said intermediate hidden layer in response to a (any) single input example.

Thus embodiments of this method take a snapshot of the activity of one or more hidden layers of neurons and identify, in effect, those with shared higher-level features or concepts as represented by overlapping activation. Here overlapping activation may be defined as greater than a threshold level of overlap between corresponding neurons activated by different input examples; conceptually it may be considered as a spatial overlap (i.e., intersection) of patterns of activation. The overlap may be determined by a range of different techniques. For example the activation of a neuron may be binary and where neurons have binary values a binary AND function may be employed. For a continuous variable, or stochastic value, or probability, the values of two (or more, dependent on the number of simultaneously considered patterns for determining the overlap) neuron activations may be multiplied or some other similar function such as a minimum of the two (or more) neuron activations may be employed. Thus it will be appreciated that it is not the activations of different neurons that are multiplied; instead, we multiply (neuron-by-neuron) the activations over different patterns. In embodiments the threshold level of activation of a neuron for being included in the overlap after this operation may be arbitrarily close to zero, but is always larger than zero. Where the neurons have activation functions that are both positive and negative, such as a tanh activation function (as compared with a purely positive activation function, such as a sigmoid or binary function), one can apply an additional step of using the absolute value of the activations for the overlap search.

In general in this specification where references are to a continuous value in a deterministic network; in a stochastic network a probability may be employed.

Broadly speaking determining the overlap or intersection of stored patterns of activation identifies features which are common amongst multiple training or use examples. It is advantageous if the hidden layer of neurons from which a pattern of activation is captured uses a sparse representation of features. With such a representation a large number of neurons is employed in a layer but only a relatively small percentage of neurons are activated by any particular input, for example less than 20%, 15%, 10% of the neurons having greater than a threshold activation. Conceptually just a small fraction of the neurons (corresponding to features)—though potentially still of the order of hundreds out of thousands of neurons—fire on one input and a different fraction of neurons fire on a different input, facilitating identifying overlaps.

In embodiments a degree of sparseness may be determined by a percentage of neurons which are activated (or which have greater than a threshold level of activation); alternatively a degree of sparseness may be determined by summing the activation from all the neurons and determining this as a proportion or percentage of a total possible activation. According to either of these measures a preferred degree of sparseness is less than 15% or less than 10% activation; as sparseness in the range 1-10%, for example of around 5% has been found to work well in practice. The degree of sparseness can be effectively determined by selecting the number of neurons in the layer (in embodiments in the range of one to a few thousand) and/or the neural network may be constrained to adopt a sparse representation, for example by including a degree of sparseness as part of the cost function for the (weights of) neurons in the relevant hidden layer from which the pattern of activation is being captured. The use of a large number of neurons and a sparse representation facilitates dis-entangling sources of variation in the input and is therefore advantageous for the hidden layer from which a pattern of activation is captured and, in particular, for the concept-identifying layer of neurons.

In this context the phrase "concept-identifying layer" is employed to denote a layer of neurons above that at which one or more overlapping patterns, in preferred embodiments defining sparse, disentangled representations of features, are replayed into the neural network so that the layer identifies higher level combinations of features or "concepts". The concept-identifying layer itself is, in embodiments, another hidden layer of the network, but with a different structure beneath it, in particular including the intermediate feature memory storing patterns of activation.

The concept-identifying layer of neurons may be an output layer of the neural network or there may be further hidden/output layers above the concept-identifying layer (here "above" denoting further from the input layer). Neural networks of the type we describe, may thus comprise a feature-identifying subset of neurons (layers) and one or more concept-identifying subsets (layers) of neurons. More particularly, a plurality of concept-identifying layers may be stacked one above another (optionally with one or more intermediate/interleaving layers), in which case each pair (or group) of concept-identifying layers may be considered, and trained, as a separate concept-identifying subset of the network. In this situation a or each concept-identifying layer may be provided with its own intermediate feature memory which may store patterns of activation from that concept-identifying layer, so that overlaps from amongst these may be determined and replayed into the layer to train a concept-learning network subset comprising that layer and the next concept-identifying layer. Thus the next concept-identifying layer, more particularly the network subset comprising that and the previous concept-identifying layer, is able to learn combinations of concepts, more particularly new combinations of concepts not present together in any single example in the training data.

In embodiments of the method the example inputs used to train the first feature-identifying subset of the neural network (lower layers in a "vertical" direction) may be the same or different to the further example inputs used to train the concept-identifying subset (one or more higher layers) of the neural network. When training the concept-identifying subset of the neural network (the higher levels) this training may be performed either with or without data on the input layer of neurons: overlap patterns may be replayed into a hidden layer at the same time as external data is input (to identify common features between the external data and the overlapping patterns of activation) and/or the input layer of neurons may be substantially silent when one or more overlapping patterns of activation are replayed into the neural network.

In preferred embodiments the capturing/storing of patterns of activation from one or more hidden layers into the intermediate feature memory continues when an overlapping pattern of activation is replayed into the neural network, so that the intermediate feature memory can capture/store overlapping patterns of activation rather than merely identifying these from within its stored patterns. These patterns have effectively been preselected (by their greater than threshold overlap) as being potentially useful for identifying concepts and it is therefore advantageous to include them amongst the patterns stored in the feature memory. In this way an overlap within the feature memory may be selected from a combination of a stored pattern of activation from the neural network and a previously identified overlapping pattern of activation, in effect a previously identified group of inputs with something in common. In embodiments with multiple concept-identifying layers of neurons the first feature memory stores patterns of inputs (and as described here, also overlaps of such patterns), but higher-level feature memories store patterns of concepts, rather than inputs (and corresponding overlaps of concepts).

In embodiments of the method it is preferable to train the lower, feature-identifying subset of the neural network to a degree without training the concept-identifying layer of neurons, and then to train the concept-identifying layer of neurons using the overlap patterns of activation from one or more previously trained hidden/intermediate layers. Thus the intermediate feature memory is effectively used to train the next level up in the neural network whilst the input is switched off.

Patterns of activation stored in the intermediate feature memory may be selected at random to determine whether or not they exhibit greater than a threshold level of overlap. Additionally or alternatively one or more heuristics may be employed, as described below. In general, however, it is advantageous to decay (re-activation levels of) captured/stored patterns of activation for the purpose of overlap discovery in the feature memory over time. The skilled person will recognise that this may be achieved in many different ways—for example by reducing the re-activation level of stored neuron activation pattern, or by selectively modifying the re-activation level of a stored pattern, for example dependent on whether or the degree to which it overlaps other patterns of activation or dependent on whether it has participated in generating an overlap pattern of activation (either with another stored pattern or with another pattern in a hidden level of the neural network). The activation level of stored neuron activation pattern may be reduced gradually (linearly, exponentially, or with a power-law), or a pattern may simply be deleted dependent on its degree of overlap, for example if it has participated in less than a threshold number of overlaps or has less than a threshold level of overlap with one or more other patterns. (Here we refer to re-activation to distinguish between the level of neural activation—which we don't want to change—and the level of re-activation of a pattern to be included in overlap detection—which is meant here).

Broadly speaking, however, reducing the re-activation level of neurons of a stored pattern of activation over time and ultimately removing it entirely from the memory helps to reduce the build-up of unwanted patterns of activation in the feature memory. Alongside this it is also preferable to maintain, or not decay, or to increase (for example to compensate decay) a re-activation level of a stored pattern of activation which is used by the neural network—for example because it has been found to have greater than a threshold level of overlap with one or more others of the captured/stored patterns. This helps the neural network to learn useful/"meaningful" concepts. The maintenance may be performed within the feature memory, or by refresh of a pattern by the neural network when similarity is detected, or in some other manner.

As mentioned above, one or more heuristics may be employed to select patterns of activation to identify potential overlap. These may include selection dependent on an associated reward, in general an external input given a weight which may be stored in association with a pattern, the weight then being used to select a pattern. In a similar manner a salience value or weight may be stored in association with a pattern. Also in a similar manner an attention value or weight may be allocated to a pattern to weight the pattern when an associated system, for example an imaging system, is paying attention to an input to the neural network from which the pattern results. This may be achieved, for example, by weighting or selecting an object in an image forming an input to the neural network. One or more of these weights associated with a pattern may be combined into a single weight associated with a pattern influenced by one or more external factors.

Other heuristics which may similarly be applied as selection weights, or identified directly, include a measure of novelty of the data at a layer of neurons, for example an example at the input layer of neurons or a pattern at a hidden layer of neurons; the size or degree of excitation of a pattern in a layer of neurons; and, when selecting overlapping patterns, the temporal proximity of the patterns. This latter may be determined by a time stamped in the patterns or the patterns may be stored in a time-ordered sequence.

As previously mentioned, when selecting overlap patterns of activation there is also a requirement for a minimum degree of overlap. Thus in some embodiments the method may include searching the feature memory for patterns which have, or are likely to have (for example because of their weights) greater than the threshold level of overlap, for replay into the neural network. Alternatively patterns of activation may be selected at random, which appears to work sufficiently well in some situations.

In a related aspect the invention provides a method of learning concepts using a neural network, the neural network comprising a first, feature-identifying subset of said neural network, having an input layer and one or more hidden layers including an uppermost, feature-identifying layer of neurons; and at least one concept-identifying layer of neurons above said first, feature-identifying subset of said neural network; the method comprising: training said first, feature-identifying subset of said neural network comprising said input layer and said one or more hidden layers of neurons on a set of training examples to provide a first, feature-identifying subset of said trained neural network; storing patterns of activation of said uppermost hidden layer of said trained feature-identifying subset of said neural network after said training; and training a second, concept-identifying subset of said neural network, comprising said uppermost hidden layer of said feature-identifying subset of said neural network and said at least one concept-identifying layer of neurons, by activating said uppermost hidden layer of said feature-identifying subset of said neural network with overlap patterns defined by overlaps between said stored patterns of activation.

Embodiments of this method, like the previously described embodiments, enable a deep neural network to do more than simply adjust itself to fit the input data, in that they can identify "meaningful" feature activations, that is generalised categories of concept. The method we describe addresses difficulties with conventional approaches, which find it difficult to learn concepts that are not salient in the overall distributions of the input examples, but which are implicitly defined by, for example, a potentially small number of relevant examples, or which are hidden by other aspects of the input distribution, and which can only be discovered at a sufficiently disentangled level of representation of the inputs. Thus embodiments of the above described method in effect take a snapshot of a pattern of activation of features at a hidden layer of the neural network and store this in memory, for example using a hash table. Then a "super-activation" can be identified by identifying overlaps between a plurality of the stored patterns with greater than the threshold level of activation, and this "super-activation" pattern, that is just the overlap can be replayed into one of the deep, hidden levels in order that one or more of the levels above this can learn the concept associated with the overlap. Optionally the pattern of overlap can also be stored back into the memory to facilitate combining overlaps with each other and/or other patterns of activation. In this way, for example, embodiments of the neural network are able to learn the concept of, say, "blueness" even though it is not present on its own in any of the input examples. In effect embodiments of the method/neural network reset the training level at the point of which the overlapping patterns of activation are injected back into the neural network and trains the next higher level on extracted concepts rather than on input examples. Similarly other generalised concepts such as shape, configuration, pattern and the like may be identified in external input data, in particular data derived from the physical world. Such data may include, but is not limited to visual (image) data, audio data, tactile (haptic) data, and the like.

Where the neural network comprises a generative neural network such as a Helmholtz machine, Boltzmann machine or generative variants of autoencoder (see, e.g., "A generative process for sampling contractive auto-encoders", Rifai et al. arXiv preprint arXiv:1206.6434, 2012) then embodiments of the neural network/method are also able to generate "new" instantiations of examples, which may not exist in the real world, for example a blue cat, when learned concept representations of "blue" and "cat" are activated. Thus in embodiments of the method/neural network there is a (concept) layer of neurons which comprises groups of neurons activatable by features (concepts) which are not explicitly present and represented separately by a pattern of activation in a lower hidden layer.

In preferred implementations of the methods/neural network the training is unsupervised and the neural network is of a type which permits unsupervised learning, for example an autoencoder, Boltzmann machine or Helmholtz machine (or a variant of these). This is very useful but not essential—in principle embodiments of the method may also be used with a (deep) neural network which employs supervised training, for example any variant of a multi-layer perceptron (MLP). For supervised training the input may be presented with examples of known concepts.

As previously mentioned, preferably the neural network has hidden layers with sparse activation. Preferably the neural network is a deep neural network, but for some datasets it has been found best for there to be a relatively small number of hidden layers between the input layer and the hidden layer of neurons providing patterns to the memory—for example 1-10 such hidden layers. In embodiments there may only be 1-4 hidden layers beneath the concept-identifying layer of neurons.

Although the neural network may comprise an autoencoder, in some preferred implementations the neurons are stochastic and the neural network is a stochastic neural network such as a Boltzmann machine or a Helmholtz machine. In such a neural network the value of a neuron specifies the probability that that neuron will fire, according to a probability-generating activation function such as a sigmoid function. Thus an individual neuron may be on or off with an average, percentage activation over time corresponding to the probability defined by the value of the neuron and an associated probability function. For example, an activation value of 0.8 has the neuron on 80% of the time. The use of a stochastic neural network has been found to improve training.

As previously mentioned, a neural network/method as described above preferably processes observation data representing the observed state of a monitored entity. Thus input data to the system may be data from the real, physical world, for example from one or more sensors. This data may be provided in the form of a vector, matrix or other data structure as an input to the neural network which operates as a signal processor to provide an output signal representing a processed version of the observation data for example comprising one or more signals responsive to the identified content of the observation data. The observation data may be, for example, image data, sound data, sensor data for example for robot and/or machine control, or other real-world data such as, for example, weather data, data defining one or more properties or characteristics of materials including macroscopic and/or microscopic data, molecular/atomic coordinates and the like, biotechnology data such as a gene or protein sequence, database data for example for performing a search of the data including but not limited to text and/or multimedia data, and the like.

The skilled person will appreciate that although it is convenient to refer to a neural network, conceptually the computing procedure may be implemented in an equivalent structure such as a causal chain or field or using some equivalent directed or undirected graphical model.

We have described methods in corresponding neural networks which employ an activation pattern memory and a system for detecting overlaps of stored patterns, to improve the signal processing of a network.

According to a related aspect of the invention there is provided a concept-learning neural network architecture, the architecture comprising: an input layer of input neurons, one or more hidden layers of neurons in successive layers of neurons above said input layer, and at least one concept-identifying layer of neurons above said one or more hidden layers of neurons, wherein each said layer of neurons is connected to the layer of neurons below; and wherein said architecture further comprises: an intermediate feature memory, coupled to an intermediate said hidden layer of neurons between said input layer and said at least one concept-identifying layer, to receive data from said intermediate hidden layer of neurons and to store a pattern of activation of said intermediate hidden layer of neurons; and a system to determine an overlap between a plurality of said stored patterns of activation, said overlap defining an overlap pattern, and to activate said intermediate hidden layer of neurons with said overlap pattern; such that said concept-identifying layer of neurons is configured to identify features of said overlap patterns expressing learnt concepts.

As previously described, in embodiments the system to determine an overlap is configured to identify overlapping patterns of activation stored in the intermediate feature memory. In embodiments the architecture defines two or more neural network subsets, at least a first, feature identifying network subset comprising the input and hidden layers, and a second, concept identifying network subset comprising the uppermost hidden layer and concept-identifying layer. The architecture is configured so that these may be trained separately, training the feature identifying network subset with input example data, storing features into the intermediate feature memory, then replaying overlap patterns of the stored features into the uppermost hidden layer of the feature identifying network subset, which constitutes an input layer to the second, concept identifying network subset, to train the concept identifying network subset. In embodiments the architecture comprises a plurality of stacked concept identifying network subsets, each with associated intermediate feature memory, arranged so that the upper layer of one concept identifying network subset provides the input layer of the next, higher concept identifying network subset. Again these are arranged such that each separate concept identifying network subset may be trained separately.

In a further aspect the invention provides a method of using the above-described concept-learning neural network architecture to identify concepts, the method comprising: presenting one or more example datasets to the input layer of a neural network having a neural network architecture as described above; reading a pattern of activation of neurons from said concept-identifying layer of neurons; and determining one or more concepts from said read pattern of activation.

The invention also provides a method of using the concept-learning neural network architecture described above to generate new example data for new examples, the method comprising: exciting a pattern of activation into said concept-identifying layer of neurons, wherein said pattern of activation defines one or more concepts learnt by said neural network architecture; propagating said pattern of activation down through said neural network architecture to define an activation pattern at said input layer of neurons; and reading said activation pattern of said input layer of neurons to provide said new example data.

In both the above cases the system is able to identify concepts/generate examples which are outside or extend beyond the training distribution—for example a system which had learned the concepts "pink" and "elephant" could be able to recognise the presence of both concepts or generate ("imagine") an example of a pink elephant even though it had never seen one.

When generating a new example, projecting downwards from a higher to a lower concept-identifying layer of neurons, and/or down to a layer of a feature-identifying subset of the network, a generated ("imagined") concept or example may be combined with an "observed" concept or feature, from an input layer of the network and/or retrieved from the intermediate feature memory (either as a previously stored pattern, or as an overlap pattern). Thus combinations of "imagined" and "observed" concepts and/or related features may be formed.

The above described architecture and methods may be implemented in software and/or in hardware, in particular an electronic circuit. The hardware may be dedicated hardware, for example one or more ASICs (Application Specific Integrated Circuit) or reconfigurable hardware, for example one or more FPGAs (Field Programmable Gate Arrays), or the neural network may be implemented in software, for example on a digital signal processor or general purpose computing system, or a combination of hardware and software may be employed. The neural network architecture may be implemented in a general purpose or dedicated computing system.

Thus the invention further provides processor control code to implement the above-described systems and methods, for example on a general purpose computer system or on a digital signal processor (DSP). The code is provided on a physical data carrier such as a disk, CD- or DVD-ROM, programmed memory such as non-volatile memory (e.g. Flash) or read-only memory (Firmware). Code (and/or data) to implement embodiments of the invention may comprise source, object or executable code in a conventional programming language (interpreted or compiled) such as C, or assembly code, or code for a hardware description language. As the skilled person will appreciate such code and/or data may be distributed between a plurality of coupled components in communication with one another.

BRIEF DESCRIPTION OF THE DRAWINGS

These and other aspects of the invention will now be further described, by way of example only, with reference to the accompanying figures in which.

DETAILED DESCRIPTION OF PREFERRED EMBODIMENTS

Figure 1:
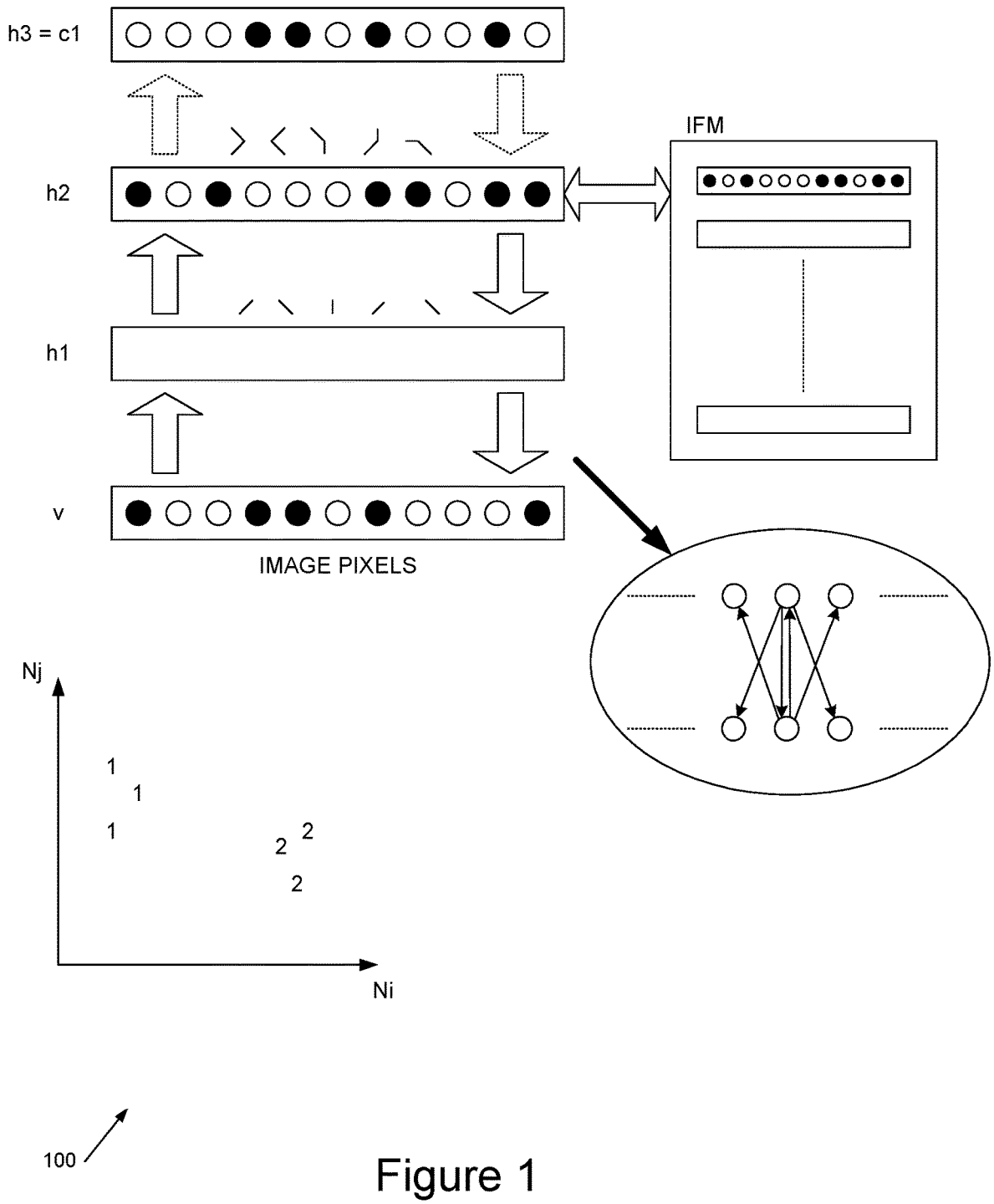
FIG. 1 shows a schematic illustration of a neural network architecture and method according to an embodiment of the invention.

Referring to FIG. 1, this shows an artificial neural network 100 comprising an input, 'visible' layer of neurons v above which lie first and second hidden layers of neurons h1, h2. A further layer of neurons which would, in a conventional architecture, be a further hidden layer h3, acts as a concept-identifying layer of neurons c1 activated by features in the input layer v but, more particularly, trained on overlap patterns as described further below. Layers v, h1, h2 form an unsupervised deep neural network such as an autoencoder or a stochastic neural network such as a deep Boltzmann machine, deep restricted Boltzmann machine or autoencoder. An intermediate feature memory, IFM, is coupled to hidden layer h2 to store patterns of activation from the hidden layer and to replay overlaps of these patterns of activation into layer h2 when training the neural network h2, c1.

Initially deep neural network (DNN) v, h1, h2 is trained on input data d, for example image data. By way of illustration, this neural network may be trained on a set of images of digits from 1 to 9 so that layer h1 identifies strokes making up the digits, as conceptually illustrated in FIG. 1, and layer h2 combinations of strokes, as conceptually illustrated. Conventionally a higher layer of the neural network could learn to classify the combinations of strokes as digits. Alternatively a linear classifier may be applied to layer h2 to classify the levels of activation of the neurons in this layer into digits. Such a linear classification is illustrated in the inset figure for neurons Ni and Nj—different levels of activation of these two neurons will correspond to different digits and the linear classifier can determine a classification based on a linear combination of the vector of neuron activations. A linear classifier can be helpful when evaluating the training of the deep neural network but, in general, is not part of an embodiment of an artificial neural network according to the invention.

The training process used for the deep neural network v, h1, h2 depends upon the type of neural network implemented—for example for an autoencoder inputs from h1 and h2 are used to re-represent a version v' of visible layer v and the autoencoder weights are trained so that v' approaches v. The different types of training procedure which may be employed for different types of deep neural network v, h1, h2 will be well known to the skilled person. The weighted links between the layers are, again, conceptually illustrated by the inset to FIG. 1.

Preferably the neural network has many units (neurons) in layers h1, h2, c1 and is trained such that in each hidden layer a sparse representation is employed in which only of order 1-10% of the neurons are active for an input image, say ~10 neurons in 1000. This is helpful in enabling the neural network, and later the concept-identifying layer c1, to disentangle the sources of variation in the input data, which are then used as building blocks for concepts. Sparse coding is useful in determining pattern overlaps (described later). Training for sparse coding is typically achieved by adjusting one or more parameters of the training procedure in a manner which will be known to those skilled in the art. It will be appreciated that although the example shows two hidden layers more hidden layers or just one hidden layer may be employed although in practice using two to three hidden layers has been found best for certain datasets.

Each neuron in layer h2 has a connection to memory IFM. Once the first DNN has been trained (unsupervised) to determine the weights of the connections, examples of patterns from layer h2 are stored in memory IFM. Thus the training examples may be replayed into the trained neural network, recording one H2 vector per example into memory IFM.

The concept-identifying layer of neurons can then be trained to detect overlap between the patterns (vectors) stored in memory IFM. Thus in one approach random triplets of vectors are drawn from the memory and the overlap between these vectors determined. If there is no overlap a new triplet is drawn, but if there is sufficient overlap then a second neural network comprising layers h2 and c1 (and thus overlapping with the first, deep neural network) is trained on the overlap. As before this second neural network is preferably unsupervised and may implement, for example, an autoencoder or Boltzmann machine.

Figures 2A, 2B:
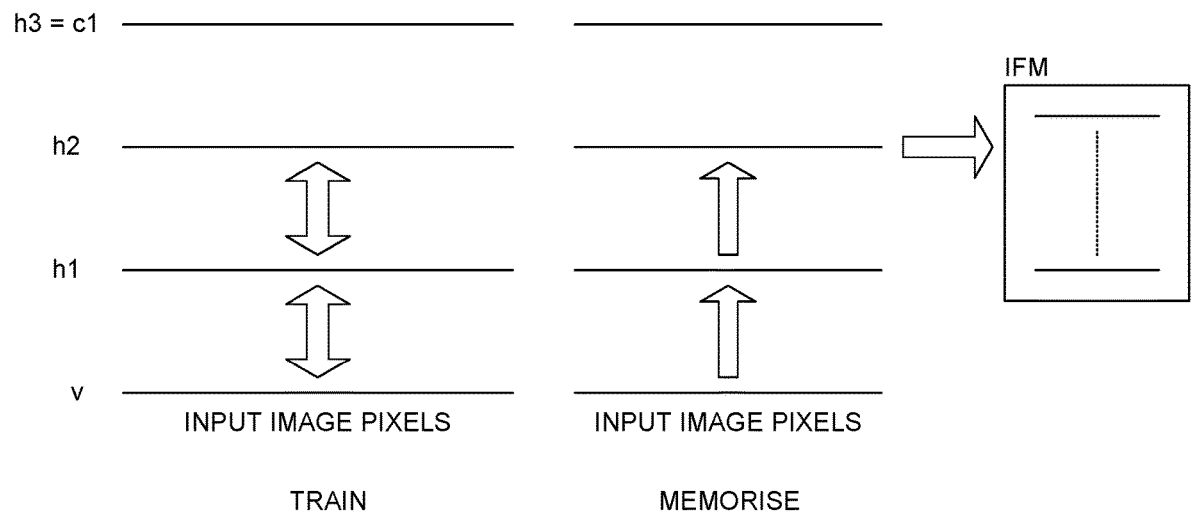
FIGS. 2a, 2b, and 2c show respectively, first, second and third phases of operation of the artificial neural network of FIG. 1.
Figure 2C:
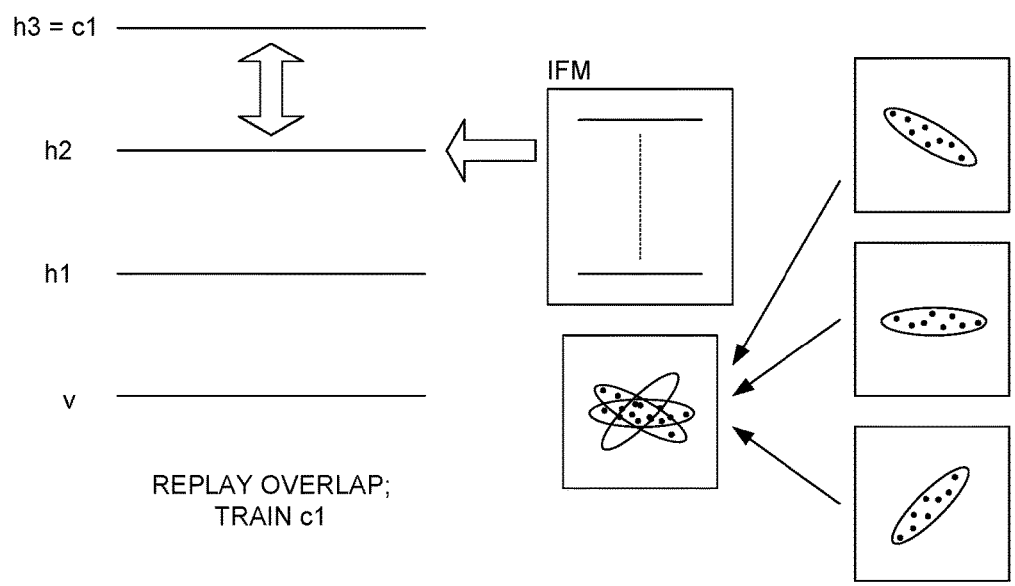

These steps are conceptually illustrated in FIG. 2 which shows, in FIG. 2a, training of the first, feature-identifying subset of the deep neural network, in FIG. 2b memorising patterns from the trained neural network, and in FIG. 2c training the higher, concept-identifying subset of the neural network including the concept-identifying layer of neurons c1. In embodiments the feature-extracting neural network subset learns specific descriptions of (aspects of) the input. In some embodiments a feature may be associated with the activity of a single hidden unit (or a single hidden unit may only be activated by one feature).

FIG. 2c conceptually illustrates the determination of an overlap pattern of activity. It can be seen that it is always a subset of any individual stored pattern and does not correspond to any specific pattern associated with an input to layer v. It will be appreciated that the higher concept-identifying neural network including layer c1 may include one or more intermediate layers between its input layer h2 and output layer c1. Preferably the number of neurons in layer c1 is similar to that in layer h2, although a smaller number of units may be employed.

Continuing with the previous example of training on a set of images of digits from 1 to 9, the trained c1 layer can learn to classify the combinations of strokes as digits, but much faster and/or with fewer examples than a conventional neural network, as well as being able to learn different types of concept to a conventional neural network, as explained further below. However it can be seen from FIG. 2c that layer c1 learns features from the input examples which may not be separable individually from these examples, for example the concept 'blueness'. Thus it can also be appreciated from FIG. 2c that although, say, a linear classifier attached to layer h2 may not be able to differentiate between individual concepts implicitly contained in h2 pattern vectors, the same kind of classifier attached to layer c1 can then distinguish between these when the higher neural network (h2, c1) has been trained.

Figure 2D:
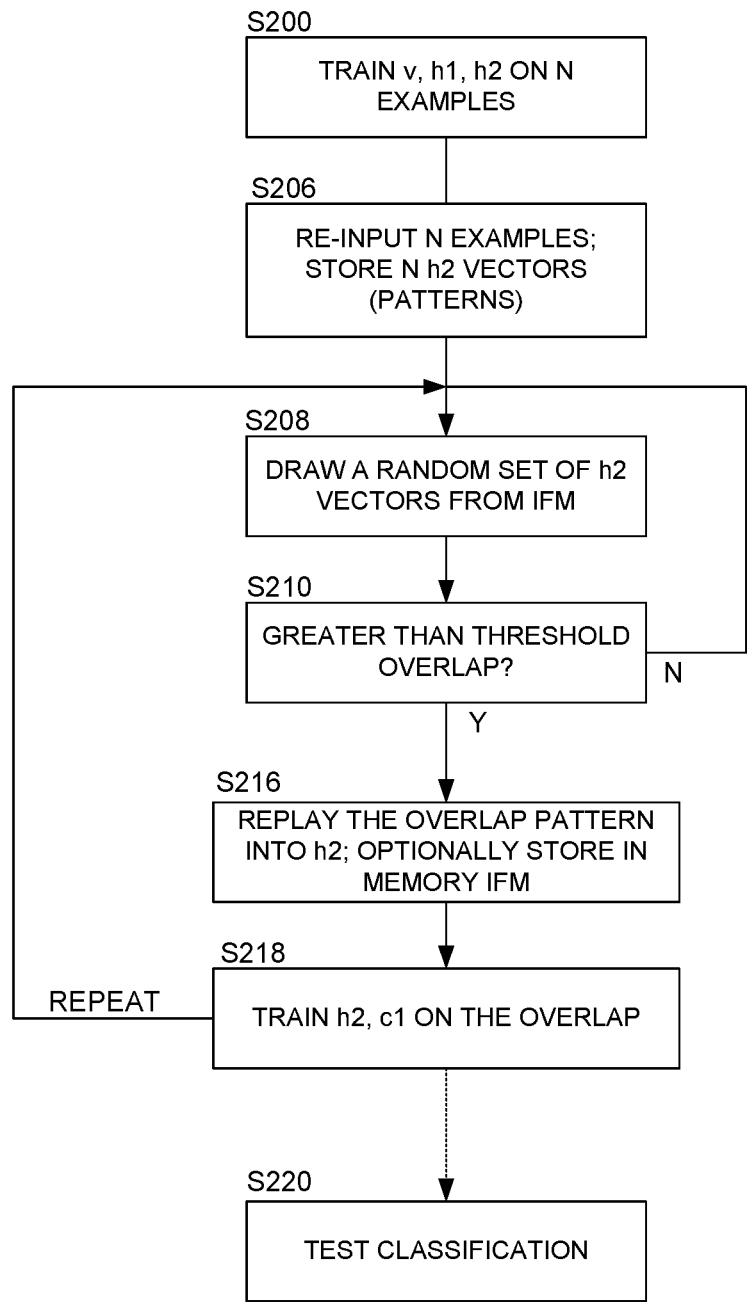
FIG. 2d shows a corresponding operating procedure.

FIG. 2d shows a procedure to operate on the artificial neural network architecture of FIG. 1. Thus at step S200 the first level of neural network (v, h1, h2) is trained on N examples (N is, say, 10,000), and then at step S206 these are re-input and the corresponding patterns in hidden layer h2 are stored. The procedure then draws a random set of vectors from IFM (S208), looping until a set is found with greater than a threshold level of overlap. There are many techniques which may be employed to calculate a degree of overlap between two or more patterns. For example for binary vectors a logical AND may be employed. For graded or continuous values, for example a sigmoid between zero and one, a multiplication may be employed (recalling that multiplying by zero gives zero), or a related function such as a minimum value may be used. The values may be deterministic or, in the case of a stochastic neural network, probabilities may be employed.

The number of vectors amongst which to detect an overlap is preferably in the range 2-10 and may be determined by experiment. The aim is to determine a set of vectors with sufficient overlap, where 'sufficient' is in part dependent on the particular representation, and how fine-grained concepts it is desired to extract. For example to differentiate between digits the overlaps should be large enough to be produced mainly by pure groups of digits (such as $\{1,1,1\}$ or $\{2,2,2\}$) rather than mixed groups (such as $\{1,2,4\}$ or $\{3, 2, 8\}$), which follows from the observation that pure groups tend to have larger overlaps. It will be appreciated that the larger number of vectors the smaller the overlap since the overlap is the intersection of the patterns as defined, for example by a logical AND operation. This is desirable as if, say, 1000 patterns were chosen at random, then an overlap would almost always be close to zero, which would be desired because almost never would all of the 1000 patterns be relevant for any particular concept. Since the overlap between 'pure' groups of examples tends to be larger than that for 'mixed' groups of examples and it can be helpful to include a requirement for greater than a threshold level of overlap so that the higher neural network and layer c1, is trained mostly on 'pure' groups of examples.

Thus once an overlap pattern has been identified this is replayed into layer h2 (S216) and the higher neural network h2, c1 is trained on the overlap (S218) before the process repeats.

In some preferred implementations an identified overlap pattern is stored back into memory IFM. This is useful because by identifying the overlap there has already been an identification of a 'useful' pattern that is one that is relevant to a shared feature of a group of examples. This is particularly the case where a threshold is applied when determining the overlap and the same or a different threshold may be applied when storing a memory pattern back into memory IFM.

Broadly speaking the training of the higher neural network takes a similar length of time to that of the first level neural network. As illustrated in FIG. 2d, optionally a linear classifier can be applied to the output from layer c1 (S220) to check the training of layer c1. As well as having the ability to learn new concepts not represented separately in the input data (as compared with merely re-representing the input data in a conventional neural network) layer c1 learns to generalise much faster than with a conventional neural network with an additional layer. Expressed differently, layer c1 is able to learn quickly with relatively impoverished data.

The above procedure is robust and picking random samples of stored vectors from memory IFM is often effective. However optionally a non-random or bias-random selection procedure may be employed and/or the number of stored patterns to replay for determining for an overlap may be varied. Thus in an extension of the above described procedure flag or marker data may be stored together with an h2 vector to define, for example, a time stamp or environment stamp for the vector. This is particularly relevant where, say, the input patterns to layer v derive from the real, physical world, for example from one or more sensors, for example image data from a camera. Then a time stamp may be employed to identify input patterns which are close together in time and/or an environment stamp may be used to identify input patterns which are close together in space and/or share some other environmental context. In a simple example this may define, say, that the images are from a single room.

In a similar manner storage of one or more pattern vectors into memory IFM may be selective dependent on external data associated, with the input example generating the pattern in layer h2. For example a further input to the architecture of FIG. 1 may comprise reward data which defines when an example presented to the neural network should be considered as having greater value than other examples presented. This reward data may be provided from one or more second sensors sensing an external real-world stimulus. For example in the case of a robot or agent such sensor data may be employed to determine when the robot/agent has performed a useful action and this can then be employed to label one or more examples presented to the neural network as being of increased value and therefore meriting storage and memory IFM. Broadly speaking either or both of a pattern vector from the first, deep neural network and a detected overlap may be stored in memory IFM (to record an experience) responsive to one or more of: reward, emotion, salience, novelty and activity strength (for example as determined by whether a sum of activities of neurons in level h2 is greater than a threshold level).

In preferred implementations of the system, whether or not there is selective storage/replay of patterns in memory IFM, the pattern vectors stored in memory IFM are adjusted so that the activation of a pattern exhibits a time-dependent (e.g., exponential or power-law) decay. This helps to prune the number of stored patterns in memory IFM, which is useful because as the number of patterns increases the search for overlapping patterns becomes harder. In preferred embodiments the decay procedure is dependent on whether or not a pattern has been identified as exhibiting an overlap—patterns which have participated in overlaps are retained (the decay is halted or reduced or the level of activation is boosted) whereas patterns which have not had an overlap are decayed and gradually dropped. Again, optionally, the decay of a pattern may be dependent on external data, for example flag/marker/reward data as previously described so that potentially more valuable patterns are not decayed or decayed more slowly than others.

Figure 3:
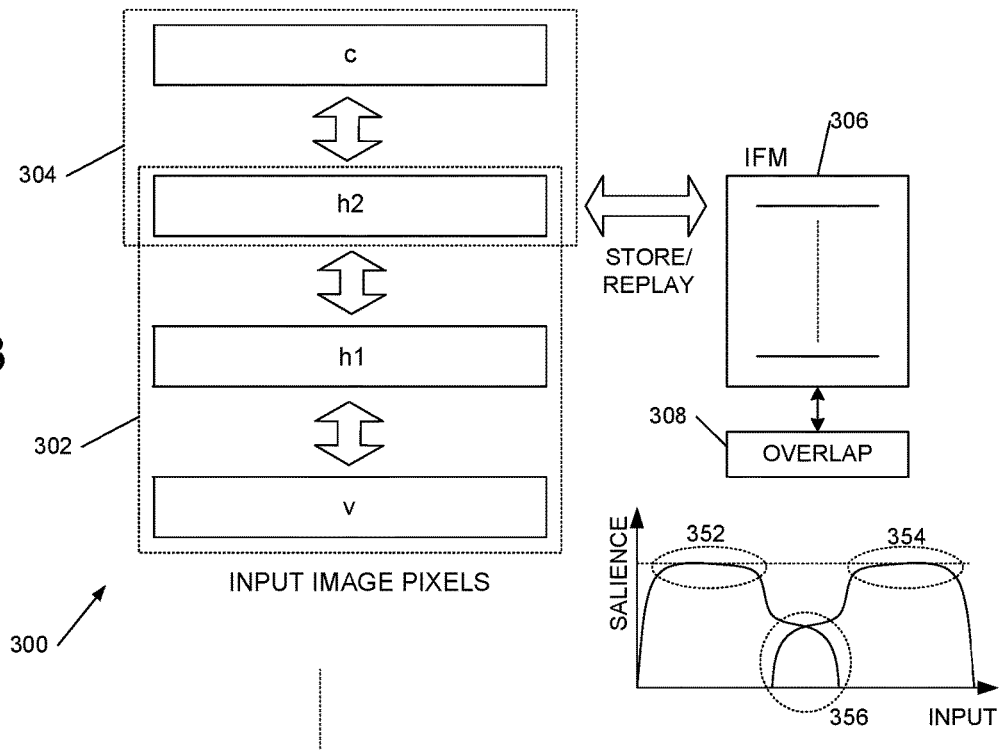
FIG. 3 shows the architecture of the neural network of FIG. 1 in more detail.

FIG. 3 shows the architecture 300 of the neural network 100 of FIG. 1 more explicitly, identifying the separate feature-extracting 302 and concept-identifying 304 subsets of the neural network. As can be seen, the uppermost layer, here h2, of the feature-extracting network stores patterns into the intermediate feature memory (IFM) 306, which has an associated overlap pattern identification module 308 which identifies regions of overlap between the stored patterns. The feature-extracting network is trained, preferably unsupervised, and then patterns are stored whilst the trained network is presented with further examples (the same and/or new examples). Then the second, concept-identifying network 304 is trained by using the overlap pattern identification module 308 to replay overlap patterns into the uppermost hidden layer of the feature-extracting network (here layer h2), which now acts as the input layer of the concept identifying network so that a combination of features learnt from overlapping patterns as training examples defines a concept. This is illustrated conceptually in the insert which illustrates an overall flat input distribution in which two parts 352 of the input, 352 and 354, are salient and can be separated out by the (conventional) feature-extracting network. A third, overlapping part 356 of the input is not salient in the input, but can be identified by the architecture of FIG. 3 by means of overlap detection.

Figure 4:
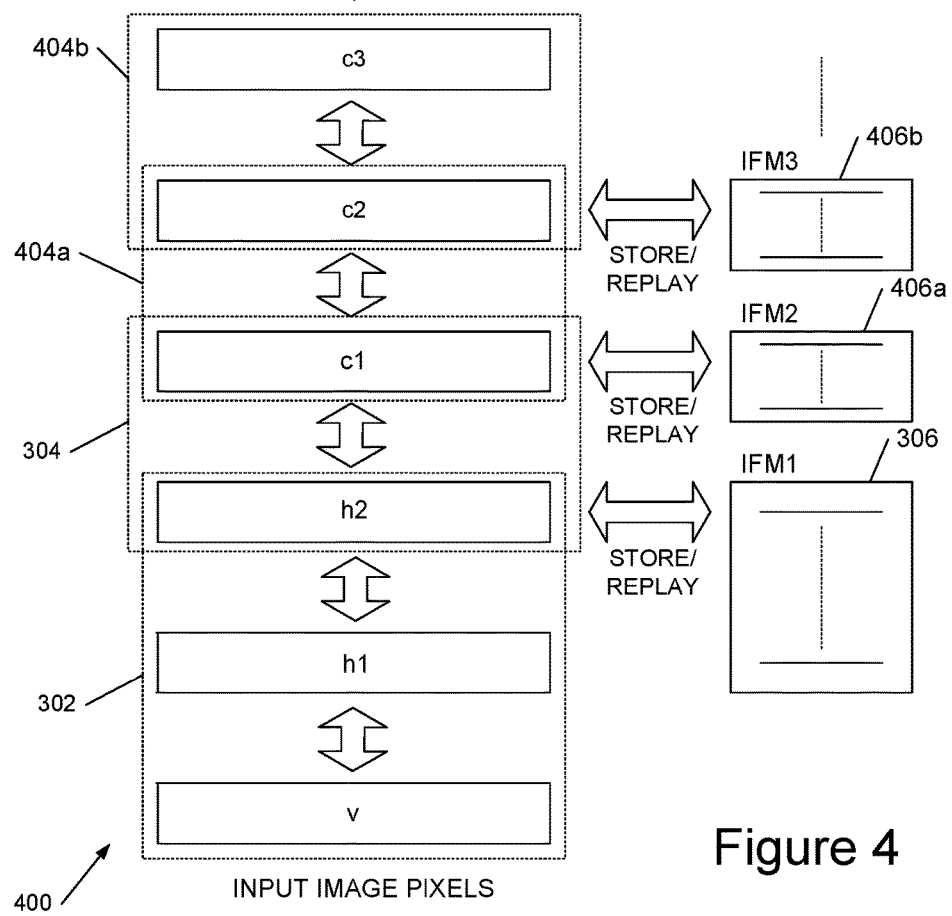
FIG. 4 shows an extension of the architecture of FIG. 3.

FIG. 4 shows an extended architecture 400 based on the architecture of FIG. 3, comprising multiple further concept-identifying identifying networks 404a, b, . . . above the first. Each of these has associated intermediate feature memory 406a, b, . . . (which may be shared or separate), each with an associated overlap pattern identification module (not shown; again which may be either separate or shared between the levels). In this way concept-identifying layer c1 of the first structure becomes the input layer of a subsequent, higher structure which has its own associated pattern memory IFM2, and so forth. In this way new combinations of features may be learned, corresponding to new generalisations of concepts, not present per se in the underlying concepts, having higher levels of abstraction. In this manner, new concepts within the overlapping stored patterns of concepts may be learnt even when not detectable separately amongst the individual overlapping patterns. Such an approach may be employed to create a hierarchical set of concept-identifying identifying network structure for identifying progressively higher level, more abstract concepts.

Advantageously such an approach may be combined with one in which, as previously described, overlap patterns are stored back into memory IFM1/IFM2/IFM3 to enable the structure to detect and learn a meta-overlap between multiple replayed overlapping memories. Approaches such as these may be employed to learn relatively high level abstract representations. As previously mentioned, it can be advantageous to employ a generative neural network such as a Boltzmann machine since this enables an input at a concept-identifying layer of neurons to provide an output at a lower hidden or visible layer, for example from c1 to h2, to produce a corresponding output from the structure. The skilled person will recognise that with such an approach probabilities are stored and neurons are activated according to the stored probability values.

Figure 5:
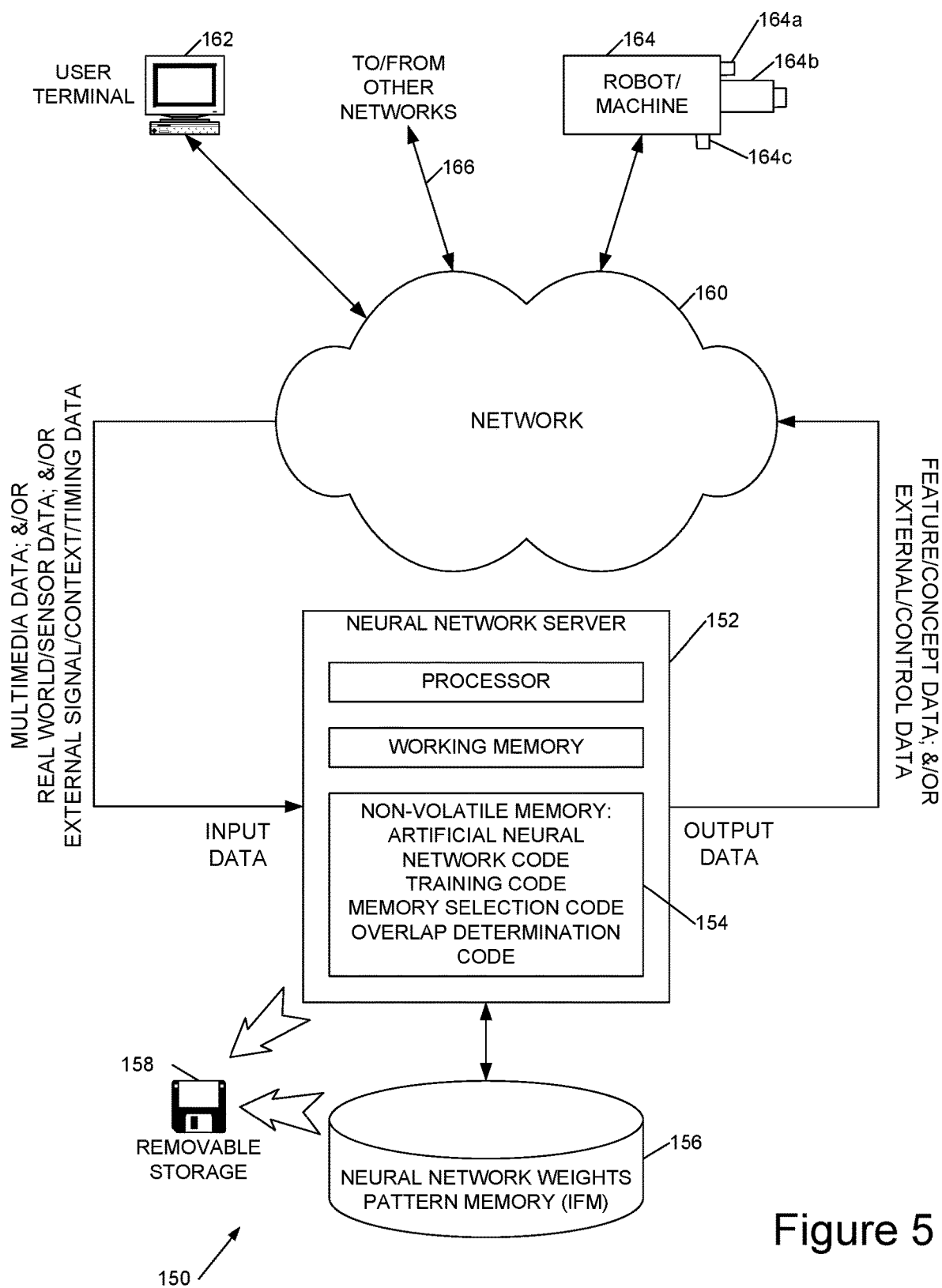
FIG. 5 shows an example of a computer system programmed to implement the artificial neural network of FIG. 1.

FIG. 5 shows a computer system 150 programmed to implement the artificial neuron network structure of FIG. 1. Thus the computer system comprises a neuron network server 152 including a processor and working memory as well as non-volatile memory 154 storing processor control code to implement the artificial neural networks of FIG. 1 and corresponding training procedures as well as at least procedures to select stored vector patterns from memory IFM and to determine an overlap between these for training the h2-c1 network. The server 152 is also coupled to non-volatile storage 156 which stores weights for neural networks and patterns from hidden layer h2. The code and/or data in memory 154 and storage 156 may be provided on a removeable storage medium, illustratively shown as disk 158.

The neural network server 152 is provided with input data which may include but is not restricted to multimedia data and/or real-world/sensor data and/or external signal/context/timing data. Similarly the neural network server 152 provides output data from one or more of the layers of neurons including, for example, feature/concept data from a c1 layer and/or external/control data for controlling an external device. In embodiments the input and/or output are via a network, which may be or include the Internet. A user may interact with the neural network server 152 to provide input data and/or receive output data via a user terminal 162 coupled to network 160 and/or network 160 may provide data to/receive data from other networks via connection 166 and/or neural network server 152 may be coupled to one or more robots/machines 164. Such a device 164 may, for example, receive audio data from a microphone 164a and/or image data from a camera 164b and/or data from one or more further sensors 164c and/or may receive data for processing via network 160. Such data may be input to the neural network server 152 and the output data from server 152 may be employed to provide audio and/or visual and/or physical-control data from robot/machine 164 to enable machine 164, for example to speak and/or provide visual image output and/or control one or more actuators.

Broadly speaking we have described techniques which are able to extract potentially abstract concepts from grounded external real-world data, automatically and unsupervised.

As we have described, embodiments of the architecture are able to extract feature combinations and abstracted concepts even when they are not salient in the input distribution (by contrast with conventional DNNs).

As illustrated in FIG. 4, embodiments of the architecture may be stacked, in principle arbitrarily deep, without the vanishing gradient problem that limits stacking depths in conventional DNNs. In effect deep layers are treated as internal input layers which are trained on data that do not correspond to any (possible) external input. Instead the training data corresponds to abstractions derived from a number of individual inputs.

Embodiments of the architecture we describe are able to create explicit, that is sparse and localised, representations of abstract concepts that are grounded in expedience, that is which are derived from, and mechanistically connected to, real-world (external) sensor data. Further, in embodiments these learnt concepts may be activated top-down to generate 'imagined' experiences. Such 'imagined' experiences are not required to comply with the input data distribution (by contrast with a conventional DNN which can only learn a generative model of the input distribution). Thus in embodiments of the architecture we describe the generalisation is not limited to stay within the bounds of the learned input distribution.

Embodiments of the structure we have described can detect, and learn from, useful commonalities between rare instances of inputs, even when they are few and spread far apart in the input stream. Thus, for example, learning of the generalised higher-order representations may be biased in an arbitrary number of ways and are therefore not restricted to the statistics of the external input. Thus the stored patterns in memory IFM may be 'enriched' to facilitate searching these to determine the most beneficial subset to replay.

No doubt many other effective alternatives will occur to the skilled person. It will be understood that the invention is not limited to the described embodiments and encompasses modifications apparent to those skilled in the art lying within the spirit and scope of the claims appended hereto.

We claim:

1. A system comprising one or more computers and one or more storage devices storing instructions that when executed by the one or more computers cause the one or more computers to implement a concept-learning neural network, the concept-learning neural network comprising:
   a plurality of layers of neurons, the plurality of layers comprising:
      an input layer of input neurons,
      one or more hidden layers of neurons above the input layer, and
      at least one concept-identifying layer of neurons above said the or more hidden layers of neurons, wherein each layer of neurons is connected to the layer of neurons that is below the layer in the concept-learning neural network;
   an intermediate feature memory configured to receive data from a particular one of the hidden layers of neurons and to store a plurality of patterns of activation of the particular hidden layer of neurons generated as a result of processing a plurality of input examples; and
   a subsystem configured to:
      determine an overlap between a plurality of the stored patterns of activation in the feature memory, wherein the overlap defines an overlap pattern, and wherein an overlap pattern defines a subset of neurons in the particular hidden layer common to all the patterns of the plurality of patterns in which the neurons of the subset have greater than a threshold level of activation in all of the plurality of patterns;
      activate the particular hidden layer of neurons with the overlap pattern; and
      train the concept-identifying layer of neurons on an output of activating the particular hidden layer of neurons with the overlap pattern to identify features that are shared among the plurality of input examples.

2. The system of claim 1, wherein, as a result of (i) the connection between the concept-identifying layer and the one or more hidden layers and (ii) the subsystem activating the particular hidden layer of neurons with the overlap pattern, the concept-identifying layer of neurons is configured to identify features of the overlap pattern expressing learnt concepts.

3. The system of claim 1, wherein the neural network comprises a plurality of hidden layers of neurons, wherein the hidden layers of neurons comprise a first hidden layer of neurons connected to the input layer of neurons, and one or more intermediate hidden layers of neurons above the first hidden layer of neurons, wherein the at least one concept-identifying layer of neurons is above the one or more intermediate hidden layers of neurons.

4. The system of claim 1, wherein the neural network comprises a plurality of subsequent concept-identifying layers above the at least one said concept-identifying layer, wherein each subsequent concept-identifying layer is coupled to receive a concept activation pattern from a previous concept-identifying layer beneath the subsequent concept-identifying layer, wherein each previous concept-identifying layer has an associated intermediate feature memory coupled to the previous concept-identifying layer to store patterns of activation from, and replay overlap patterns of activation into, the previous concept-identifying layer.

5. The system of claim 1, wherein the neural network is a stochastic neural network with sparse hidden activations.

6. One or more non-transitory computer-readable storage media storing instructions that when executed by one or more computers cause the one or more computers to implement a concept-learning neural network, the concept-learning neural network comprising:
   a plurality of layers of neurons, the plurality of layers comprising:
      an input layer of input neurons,
      one or more hidden layers of neurons above the input layer, and
      at least one concept-identifying layer of neurons above said the or more hidden layers of neurons, wherein each layer of neurons is connected to the layer of neurons that is below the layer in the concept-learning neural network;
   an intermediate feature memory configured to receive data from a particular one of the hidden layers of neurons and to store a plurality of patterns of activation of the particular hidden layer of neurons generated as a result of processing a plurality of input examples; and a subsystem configured to:
  determine an overlap between a plurality of the stored patterns of activation in the feature memory, wherein the overlap defines an overlap pattern, and wherein an overlap pattern defines a subset of neurons in the particular hidden layer common to all the patterns of the plurality of patterns in which the neurons of the subset have greater than a threshold level of activation in all of the plurality of patterns;
  activate the particular hidden layer of neurons with the overlap pattern; and
  train the concept-identifying layer of neurons on an output of activating the particular hidden layer of neurons with the overlap pattern to identify features that are shared among the plurality of input examples.

7. The computer-readable storage media of claim 6, wherein, as a result of (i) the connection between the concept-identifying layer and the one or more hidden layers and (ii) the subsystem activating the particular hidden layer of neurons with the overlap pattern, the concept-identifying layer of neurons is configured to identify features of the overlap pattern expressing learnt concepts.

8. The computer-readable storage media of claim 6, wherein the neural network comprises a plurality of hidden layers of neurons, wherein the hidden layers of neurons comprise a first hidden layer of neurons connected to the input layer of neurons, and one or more intermediate hidden layers of neurons above the first hidden layer of neurons, wherein the at least one concept-identifying layer of neurons is above the one or more intermediate hidden layers of neurons.

9. The computer-readable storage media of claim 6, wherein the neural network comprises a plurality of subsequent concept-identifying layers above the at least one said concept-identifying layer, wherein each subsequent concept-identifying layer is coupled to receive a concept activation pattern from a previous concept-identifying layer beneath the subsequent concept-identifying layer, wherein each previous concept-identifying layer has an associated intermediate feature memory coupled to the previous concept-identifying layer to store patterns of activation from, and replay overlap patterns of activation into, the previous concept-identifying layer.

10. The computer-readable storage media of claim 6, wherein the neural network is a stochastic neural network with sparse hidden activations.

* * * * *